United States Patent [19]
Hupp

[11] 3,976,284
[45] Aug. 24, 1976

[54] CONCRETE MIXER TRAILER

[76] Inventor: Danny R. Hupp, 610 Central, Leavenworth, Kans. 66048

[22] Filed: June 23, 1975

[21] Appl. No.: 589,122

[52] U.S. Cl.................................. 259/168; 280/475
[51] Int. Cl.².......................................... B62D 53/08
[58] Field of Search ....... 259/168, 152, 175, 159 A; 280/475, 491 R, 491 A, 482

[56] References Cited
UNITED STATES PATENTS

| | | | |
|---|---|---|---|
| 3,019,002 | 1/1962 | Prichard | 259/161 X |
| 3,112,100 | 11/1963 | Prichard | 259/175 X |
| 3,627,352 | 12/1971 | Canole | 280/475 |
| 3,746,369 | 7/1973 | Neff et al. | 280/476 R |

*Primary Examiner*—Samuel B. Rothberg
*Attorney, Agent, or Firm*—Fishburn, Gold & Litman

[57] ABSTRACT

A concrete mixer truck and a concrete mixer trailer with each adapted for mixing a concrete mix in transit and at a construction site and for discharging the mix at the site. The concrete mixer trailer towed by a concrete mixer truck includes a leading axle, an intermediate axle, and a trailing axle mounted on a trailer frame in longitudinally spaced relation and each having dual wheels on each of the opposite ends thereof for substantially equal weight distribution thereon. A longitudinally adjustable tongue structure has one end thereof pivotally connected to a leading end portion of the trailer frame for vertical swinging movement and the other end thereof adapted to be connected to a concrete mixing truck. An extensible member has one end thereof pivotally connected to an intermediate portion of the tongue structure and the other end of the extensible member engages a suitable support surface whereby the extensible member is adapted to support the tongue structure when disconnected from the prime mover and to selectively raise and lower the other end of the tongue structure. The trailer has a prime mover for driving the drum and a water tank and other equipment for mixing and discharging concrete at a building site. A concrete mixer drum is rotatably mounted on the trailer frame and has structures thereon for receiving concrete mix and discharging same after mixing.

7 Claims, 5 Drawing Figures

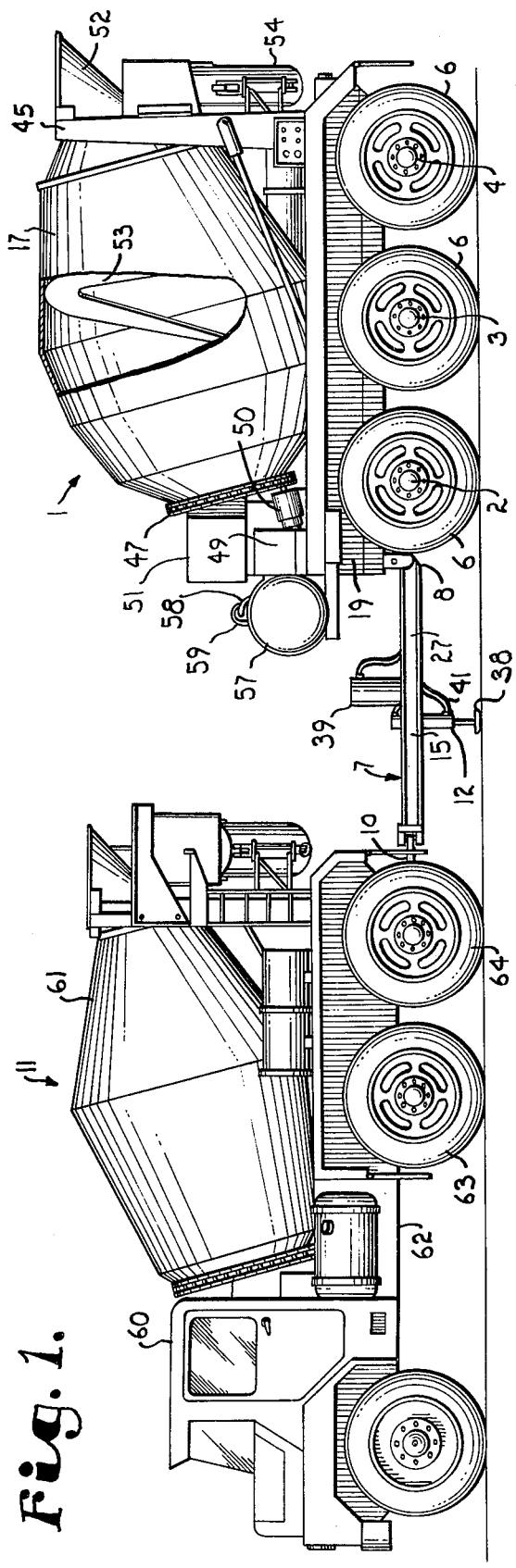
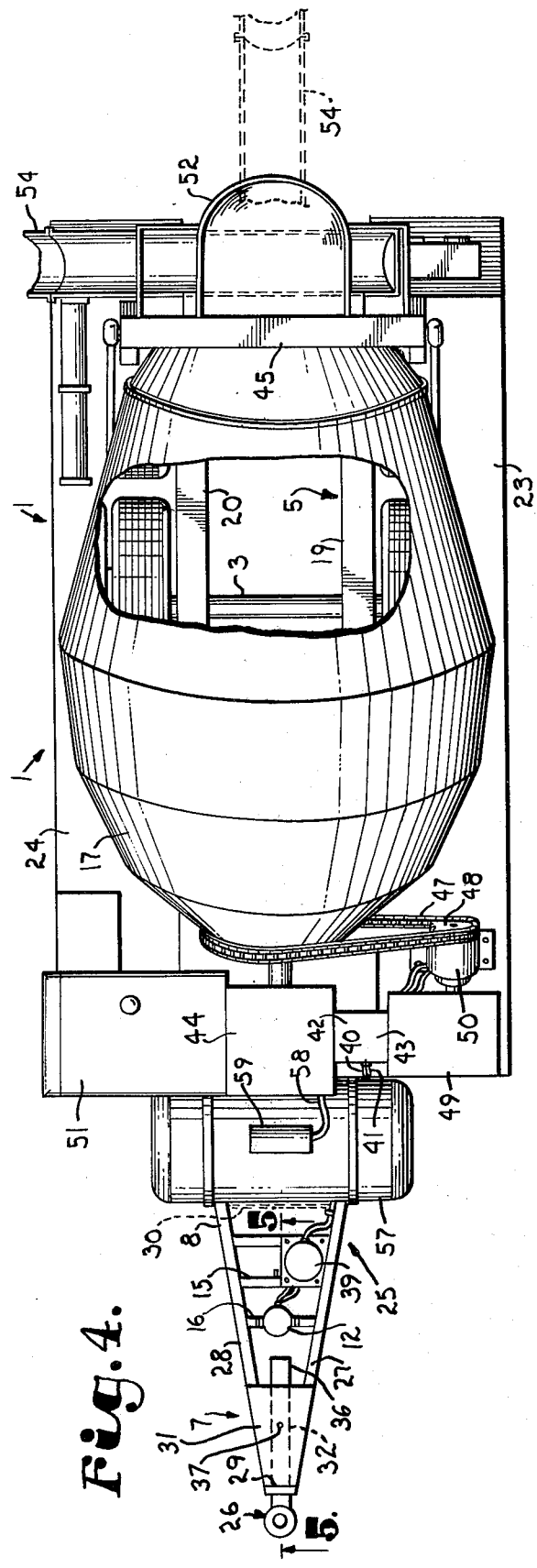

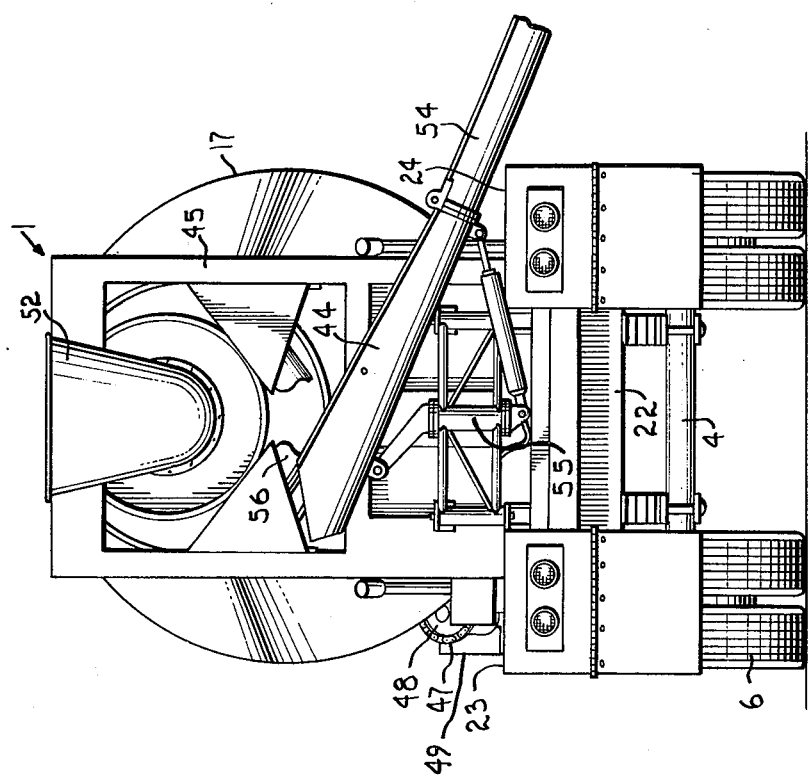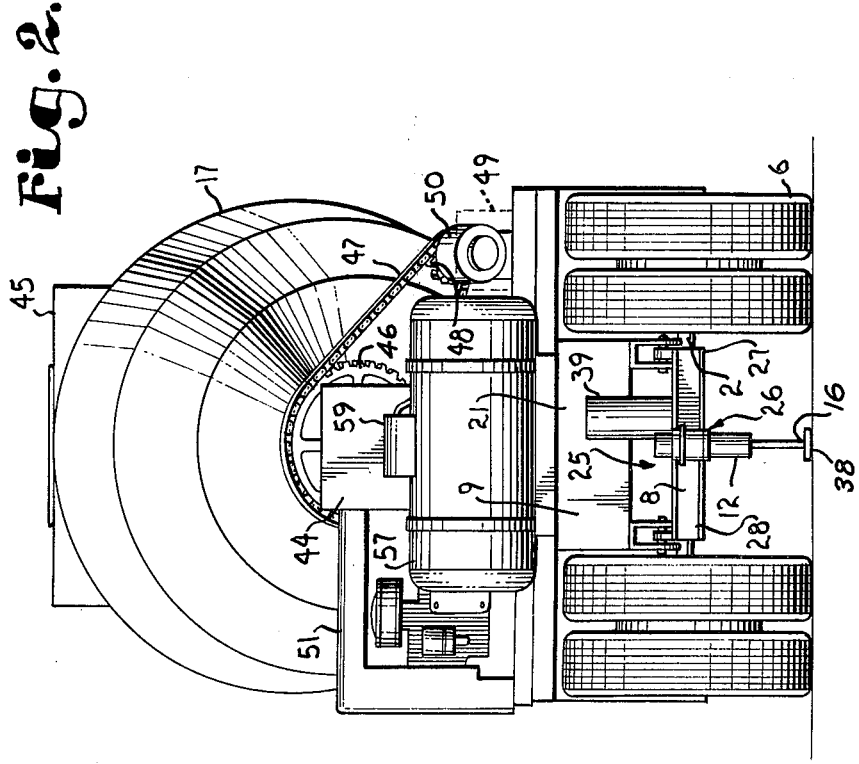

CONCRETE MIXER TRAILER

The present invention relates to concrete mixer trailers and more particularly to a concrete mixer trailer having three transversely extending axles and adapted for mixing a concrete mix in transit and at a construction site independently of operation of a concrete mixing truck towing same.

The principal objects of the present invention are: to provide a concrete mixer trailer adapted to be towed by a concrete mixer truck and adapted for mixing a concrete mix in transit or at a construction site and discharging the mix at the site after mixing; to provide such a concrete mixer trailer having a leading, intermediate, and trailing axles with dual wheels on each of the opposite ends thereof for stability, load distribution, and ease of turning; to provide such a concrete mixer trailer having a longitudinally adjustable tongue structure having one end pivotally connected to the leading end portion of a trailer frame and the other end of the tongue structure adapted to be connected to a prime mover, such as a concrete transit mixer truck; to provide such a concrete mixer trailer which pivots or turns about the other end of the tongue structure and about the intermediate axle; to provide such a concrete mixer trailer wherein the adjustable tongue structure is adapted to vary the length of the combination prime mover and trailer to thereby comply with combination length and weight requirements of various governmental agencies; to provide such a concrete mixer trailer wherein the equipment thereon is arranged for substantially equal weight distribution on each of the three axles; to provide such a concrete mixer trailer having an extensible member with one end thereof pivotally mounted on an intermediate portion of the tongue structure and adapted to support the tongue structure when same is disconnected from the prime mover and to selectively raise and lower the other end of the tongue structure for connection to the prime mover; to provide such a concrete mixer trailer of large capacity and for use in combination with a concrete transit mixer truck whereby substantially increased volume of mix is delivered per trip, all with minimum labor being required at the construction site and thereby less fuel for the same volume of concrete mix delivered to the site; and to provide such a concrete mixer trailer which is durable in construction, positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features of the concrete mixer trailer.

FIG. 1 is a side elevational view of a concrete mixer trailer embodying features of the present invention and shown connected to a prime mover in the form of a concrete transit mixer truck.

FIG. 2 is an enlarged front elevational view of the concrete mixer trailer.

FIG. 3 is an enlarged rear elevational view of the concrete mixer trailer.

FIG. 4 is an enlarged top plan view of the concrete mixer trailer.

FIG. 5 is a longitudinal sectional view taken on line 5—5 of FIG. 4 and showing means for adjusting the length of the tongue structure.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 designates generally a concrete mixer trailer adapted for mixing a concrete mix in transit and at a construction site and for discharging the mix at the site. The concrete mixer trailer 1 includes a leading axle 2, an intermediate axle 3, and a trailing axle 4 mounted on a trailer frame 5 in longitudinally spaced relation and each having dual wheels 6 on each of the opposite ends thereof. A longitudinally adjustable tongue structure 7 has one end 8 thereof pivotally connected to a leading end portion 9 of the trailer frame 5 and the other end 10 of the tongue structure 7 is adapted to be connected to a towing mixer truck 11. An extensible member 12 has one end 14 thereof pivotally connected to an intermediate portion 15 of the tongue structure 7. The other end 16 of the extensible member 12 engages a suitable support surface whereby the extensible member 12 is adapted to support the tongue structure 7 when disconnected from the prime mover 11 and is adapted to selectively raise and lower the other end 10 of the tongue structure 7. A concrete mixer drum 17 is rotatably mounted on the trailer frame 5 and has structures thereon for receiving concrete mix and discharging same after mixing.

The ilustrated trailer frame includes a pair of laterally spaced and longitudinally extending side members 19 and 20. The trailer frame 5 includes leading and trailing end members 21 and 22 thereby defining leading and trailing end portions of the frame 5. The trailer frame 5 preferably has suitable transverse bracing members extending between the side members 19 and 20 to provide a substantially right structure. The concrete mixer trailer 1 includes laterally spaced longitudinally extending deck members 23 and 24 connected to and extending longitudinally of the trailer frame 5. The deck members 23 and 24 provide fenders for the dual wheels 6 on each of the opposite ends of the axles 2, 3, and 4.

The leading axle 2, intermediate axle 3, and trailing axle 4 each extend transversely of the trailer frame 5 and are suitably connected to the side members 19 and 20 thereof. The dual wheels 6 are rotatably mounted on each of the opposite ends of each of the axles 2, 3, and 4 and preferably include suitable bearings (not shown) for free rotation.

The tongue structure 7 is illustrated as a generally triangular structure when in the retracted position with the one or trailing end 8 thereof pivotally mounted on the leading end member 21 of the trailer frame 5. The tongue structure 7 is formed of a trailing frame portion 25 and a leading or connection portion 26. The trailing or frame portion 25 has forwardly converging side members 27 and 28 and longitudinally spaced members 29 and 30. The trailing portion 25 preferably has suitably bracing members 31 extending between the side members 27 and 28 to define a substantially rigid structure. At least one tubular guide member 32 is mounted on the trailing frame portion 25 and extends longitudinally thereof.

The leading or connection portion 26 of the tongue structure 7 comprises at least one longitudinally extending shaft 36 telescopingly received in the guide member 32. Suitable fastening members 37, such as bolts, pins, or the like, are adapted to hold the longitudinally extending shaft 36 at respective selected positions in the guide member 32 to maintain a selected spacing between the opposite ends 8 and 10 of the tongue structure 7. The longitudinally extending shaft 36 comprises the other or leading end 10 of the tongue structure 7 and is adapted to be pivotally connected to the prime mover 11 in any suitable manner.

The extensible member 12 is mounted on the intermediate portion 15 of the tongue structure 7 and is thereby positioned intermediate the end members 29 and 30 with the one end 14 of the extensible member being pivotally mounted on the intermediate portion 15 of the tongue structure 7. The other or free end 16 of the extensible member 12 has a suitable foot portion or plate 38 thereon which is engageable with a suitable support surface to support the tongue structure 7 when disconnected from the prime mover 11.

The extensible member 12 is adapted to selectively raise and lower the other end 10 of the tongue structure 7 for ease in connecting and disconnecting same from the prime mover 11. A fluid tank or reservoir 39 is mounted on the tongue frame portion 25 of the tongue structure 7. Suitable flow members 40 and 41 extend between the tank 39 and the extensible member 12 for flow of fluid therebetween.

A pump 42 is mounted on the tongue frame structure 25 and is operatively connected to the flow members 40 and 41 for controlling direction of flow in each of the flow members 40 and 41 and thereby controlling extension and retraction of the extensible member 12. A suitable reversible drive motor 43 is operatively connected to the pump 42 and is operative to control operation of the pump 42 and thereby control operation of the extensible member 12.

The concrete mixer drum 17 is rotatably mounted on the trailer frame in substantially the same manner as such drums are mounted on conventional concrete mixing trucks. In the illustrated structure, the concrete mixer drum 17 includes a conventional inclined axis concrete mixer mounted on the trailer frame 5. The mixer drum 17 is a frustoconical inclined axis type supported at its forward and rearward ends for rotation about its axis. The forward or head end is supported by a pedestal 44 and the rearward end by a rear upright frame member 45. The pedestal 44 and the upright frame member 45 are fixed respectively to the leading and trailing ends of the trailer frame side members 19 and 20.

The mixer drum 17 and other equipment on the trailer frame is located relative to the axles and wheels, which are closely spaced, so the weight is evenly distributed. The axles are arranged so when turning the trailer pivots generally about the intermediate axle making the structure easily maneuverable.

The mixer drum 17 is driven by an annular drum sprocket 46 fixed to the outer periphery of the drum. A drive chain 47 interconnects the drum sprocket 46 and a drive sprocket 48. The drive sprocket 48 is powered through suitable speed reduction gearing 49 and either a mechanical or hydraulic transmission 50 which is driven by an engine or drive motor 51 mounted on the trailer frame 5 forwardly of the pedestal 44.

Ingredients forming a concrete mix are supplied to the mixer drum 17 through a charging hopper 52 disposed adjacent an open rearward end of the drum 17. The hopper 52 is constructed and positioned to funnel the ingredients and downwardly and into the interior of the mixer drum 17. A suitable spiral or helical mixing and discharge blade is mounted on the interior of the mixer drum 17. When the drum 17 is rotated in one direction the blade 53 carries the concrete toward the closed head or leading end of the drum and rotation of the drum 17 in the opposite direction moves concrete mix upwardly and rearwardly where it is discharged over a lip defining the open end of the drum 17.

A discharge chute 54 is attached by means of a suitable vertical axis pivot structure 55 to the upright frame member 45 such that its upper receiving end is always positioned directly below a discharge hopper and below the lip of the drum 17 for receipt of the concrete mix discharged therefrom. The chute 54 directs the concrete mix by gravity either to a final placement or to a receiving means, such as a bucket, wheelbarrow, or the like, by which the concrete may be moved to a location not accessible for direct placement from the discharge chute 54.

A water tank 57 is mounted on the leading end portion 9 of the trailer frame 5 and is positioned adjacent the drum drive motor 51. A flexible flow member 58 extends from the tank 57 and is adapted to communicate with the concrete mixer drum 17 for controlled flow of mixing water thereinto. A suitable valve may be mounted in the flow member 58 or in a pump 59 to control the amount of mixing water delivered to the drum 17 for mixing with the ingredients therein.

The prime mover 11 is preferably a conventional concrete mixing truck or the like having suitable power to pull the concrete mixer trailer 1. In the illustrated structure, the prime mover 11 has a cab 60 and a concrete mixer drum 61 rotatably mounted on a suitable chassis 62 having tandem axles with dual wheels 63 and 64 respectively mounted on each of the opposite ends thereof. The mounting and drive of the mixer drum 61 on the chassis 62 is substantially similar to the mounting and drive of the mixer drum 17 on the trailer frame 5. The receiving of the concrete mix and discharging of the concrete mix after mixing in the drum 61 is substantially similar to that of the mixer drum 17 on the trailer frame 5.

The prive mover 11 and the concrete mixer trailer 1 provide a combination having substantially increased capacity for delivering mixed concrete ingredients to a construction site and requires only a nominal increase in fuel used for delivering the substantially increased quantity of concrete mix.

It is to be understood that while I have illustrated and described one form of my invention, it is not to be limited to the specific form or arrangement of parts herein described and shown.

What I claim and desire to secure by Letters Patent is:

1. A concrete mixer trailer comprising:
   a. a trailer frame having a leading end portion and a trailer end portion;

b. at least three longitudinally spaced transverse axles mounted on said trailer frame and arranged as a leading axle and an intermediate axle and a trailing axle, said leading, intermediate and trailing axles being substantially equally spaced with each having dual wheels on opposite ends thereof;

c. a tongue structure having one end with transversely spaced pivotal connections to the leading end portion of said trailer frame for vertical swinging movement about a horizontal axis, the other end of said tongue structure being adapted to be pivotally connected to a prime mover; and d. a concrete mixer drum rotatably mounted on said trailer frame and having means thereon for receiving concrete mix and for discharging the concrete mix from said drum after mixing therein, said drum being generally longitudinally of the trailer frame with the mid-portion thereof positioned over the intermediate axle with all of the axles being within the length of the drum and thereby under same for substantially equal weight distribution on said axles.

2. A concrete mixer trailer as set forth in claim 1 wherein said tongue structure includes:

a. a tongue frame portion including the one end of said tongue structure;

b. longitudinally extending guide means mounted on said tongue frame portion;

c. a connection portion received in said guide means and longitudinally movable relative to said tongue frame portion for varying the length of the tongue structure, said connection portion including the other end of said tongue structure; and d. fastening means engageable with said connection portion and said guide means for retaining a selected spacing between the ends of said tongue structure.

3. A concrete mixer trailer as set forth in claim 1 including:

1. a drum drive motor mounted on said trailer frame adjacent to and operatively connected to said concrete mixer drum for selectively rotating same;

b. a tank mounted on the leading end portion of said trailer frame and positioned adjacent said drum drive motor;

c. a flow member extending from said tank and communicating with said concrete mixer drum for controlled flow of mixing water thereinto; and d. said drive motor and mixer drum being arranged on said trailer frame substantially within the length from the front of the wheels on the leading axle to the rear of the wheel on the trailing axle.

4. A concrete mixer trailer as set forth in claim 2 including:

a. a fluid operated extensible member having one end thereof pivotally mounted on said tongue structure and a foot member on the other end thereof for engaging a support surface for selectively raising and lowering said other end of said tongue structure;

b. a fluid tank mounted on said tongue structure and having flow members communicating with said extensible member; and c. power means mounted on said tongue structure and including pump means for selectively effecting extension and retraction of said foot member.

5. In combination:

a. a prime mover having a concrete mixer drum rotatably mounted thereon and having means thereon for receiving concrete mix and for discharging the concrete mix from said drum after mixing therein;

b. a trailer frame having a leading end portion and a trailing end portion;

c. three longitudinally spaced transverse axles mounted on said trailer frame and arranged as a leading axle and an intermediate axle and a trailing axle, said three axles being substantially equally spaced with each having dual wheels on opposite ends thereof;

d. a tongue structure having one end thereof having transversely spaced pivotal connections to the leading end portion of said trailer frame for vertical swinging movement about a horizontal axis, the other end of said tongue structure being removably and pivotally connected to said prime mover; and e. a concrete mixer drum rotatably mounted on said trailer frame and having means thereon for receiving concrete mix and for discharging the concrete mix from said drum after mixing therein said drum being generally longitudinally of the trailer frame with the mid-portion thereof positioned over the intermediate axle and with all of the axles within the length of the drum and thereby under same for substantially equal weight distribution on said axles, the weight distribution and tongue connections providing turning of the trailer about the intermediate axle in trailing movement around turns.

6. In combination as set forth in claim 5 including:

a. a drum motor mounted on said trailer frame adjacent to and operatively connected to said concrete mixer drum for selectively rotating same;

b. a tank mounted on the leading end portion of said trailer frame and positioned adjacent said drum drive motor;

c. a flow member extending from said tank and communicating with said concrete mixer drum for controlled flow of mixing water thereinto; and d. said drive motor and mixing drum being substantially within the length between the front of the wheels on the leading axle and the rear of the wheel on the trailing axle.

7. In combination as set forth in claim 6 wherein said tongue structure comprises:

a. a tongue frame portion including the one end of said tongue structure;

b. longitudinally extending guide means mounted on said tongue frame portion;

c. a connection portion received in said guide means and longitudinally movable relative to said tongue frame portion for varying the length of the tongue structure, said connection portion including the other end of said tongue structure; and d. fastening means engageable with said connection portion and said guide means for retaining a selected spacing between the ends of said tongue structure.

* * * * *